Oct. 4, 1966   W. J. CAGLE   3,276,404
SEED DROPPER WHEEL
Filed March 30, 1964   2 Sheets-Sheet 1
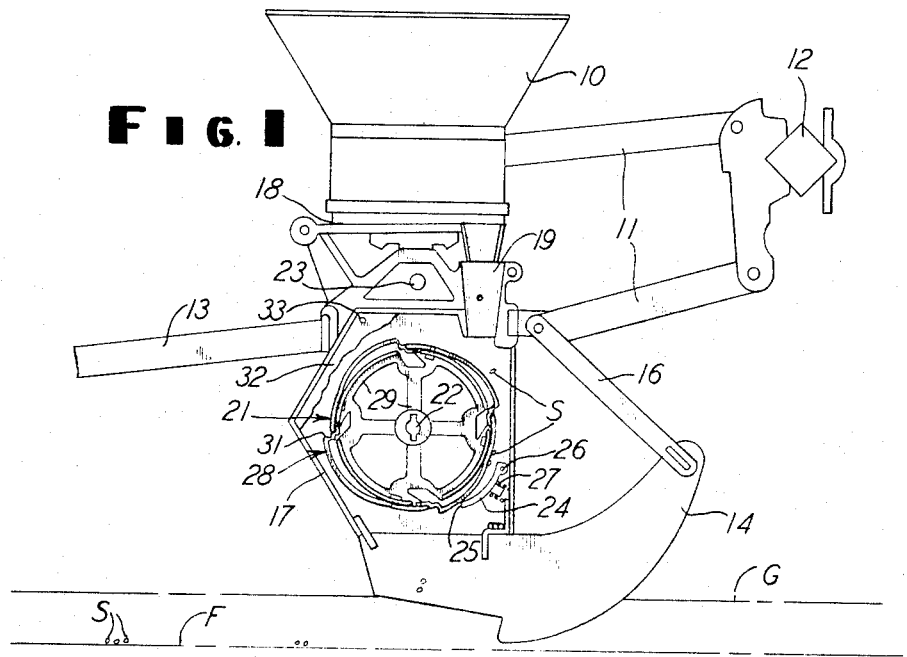
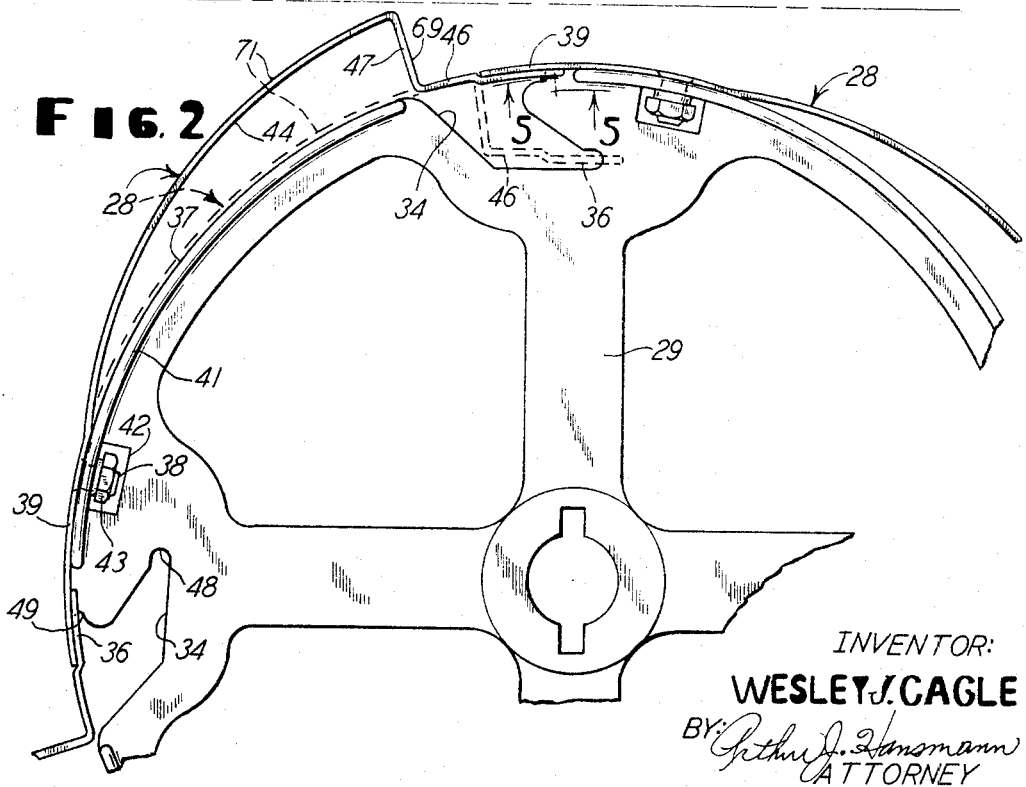
INVENTOR:
WESLEY J. CAGLE
BY: Arthur J. Hansmann
ATTORNEY

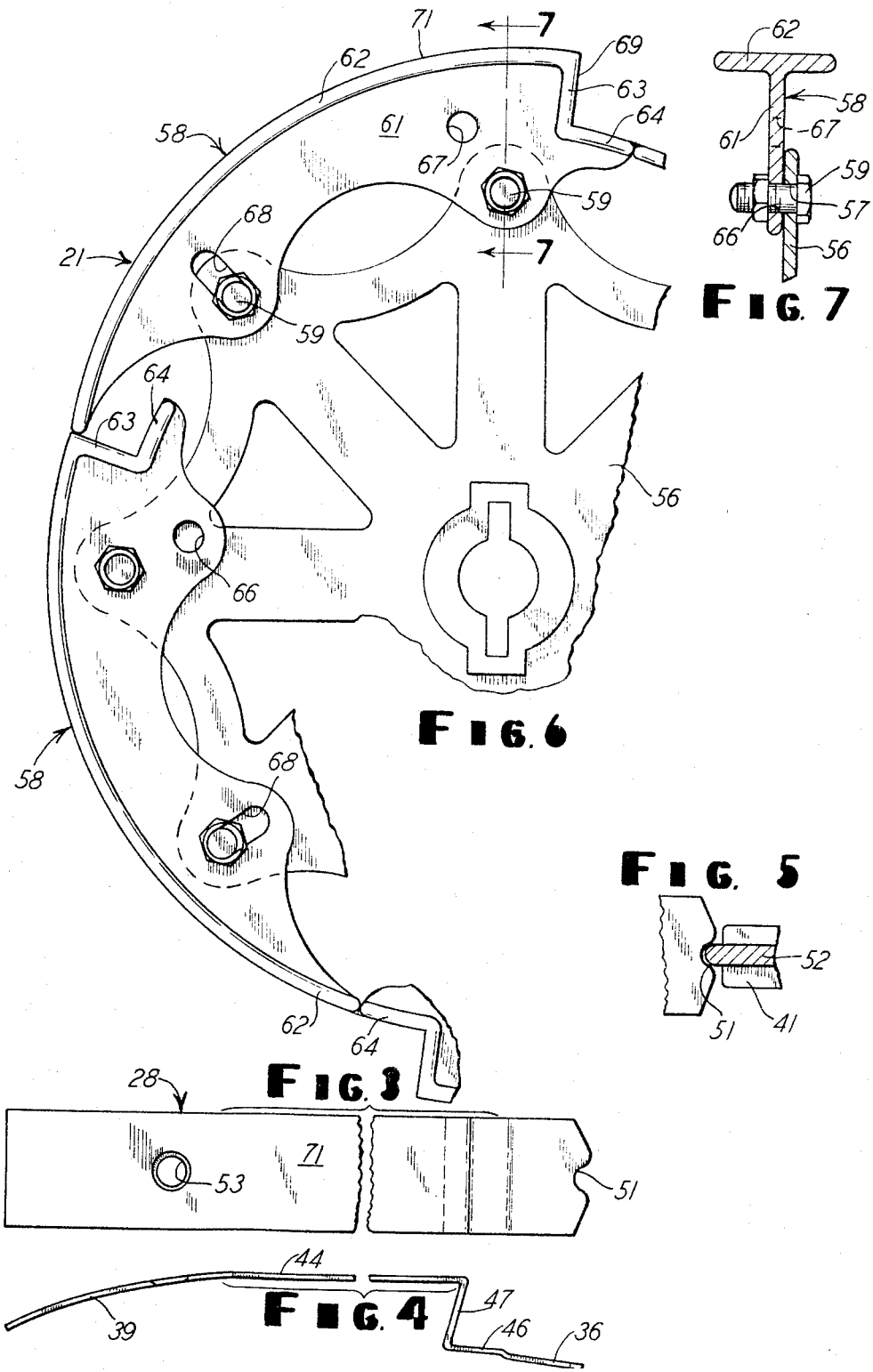

3,276,404
SEED DROPPER WHEEL
Wesley J. Cagle, Pecatonica, Ill., assignor to J. I. Case Company, Racine, Wis., a corporation of Wisconsin
Filed Mar. 30, 1964, Ser. No. 355,861
13 Claims. (Cl. 111—51)

This invention relates to a seed planter of the hill-drop type, and more particularly, it relates to the seed dropper wheel.

Planters of the type which meter and dole out the seeds directly to the ground are well known in the art. The hill-drop type of planter which disposes seeds on the ground in groups of usually two, three, or four utilizes a rotating wheel which slides over a spring-loaded plate acting as a valve. The wheel is provided with lugs or radial projections which engage the valve plate to carry the group of seeds past the valve and deposit them on the ground. In planting different types of seeds, and in other different planting conditions, it is desirous that the wheel actuate the plate at varying intervals so that the spacing of the seed groups can also be varied as desired. Some planters accomplish this feature of variability by providing the lugs on the wheel in a manner which permits the lugs to be completely removed from the wheel, and of course conversely the lugs can be added to the wheel so that variations of say one, two, or four lugs can be provided on a single wheel for depositing seeds with each full rotation or one-half rotation or one-quarter rotation, respectively, of the wheel.

The present invention accomplishes the desirable result heretofore mentioned, but it is a general object of this invention to accomplish the results in an improved manner, and to provide a wheel which is even more convenient and versatile than the wheels heretofore known.

Another object of this invention is to provide a planter wheel which can be readily converted for depositing seeds at different intervals of rotation of the wheel as heretofore mentioned, and to accomplish this object with a fully contained wheel mechanism which does not require elaborate adjusting tools and which does not require a separate storage or supply of parts in the conversion of the wheel. In accomplishing this particular object, no part of the wheel need be removed from the wheel and retained separate therefrom, but instead the lugs need only be adjusted in their position on the wheel to achieve all the versatility desired.

Still another object of this invention is to provide a planter wheel which can be readily and simply altered in its arrangement of selectivity in the number of projecting lugs, and with the alteration being accomplishable without the need for a tool of any type. In accomplishing this particular object, it is also significant that the arrangement is such that the parts need not be manufactured and maintained within close tolerances in that the parts themselves adjust to the desired fitting relationships between the parts.

Accordingly it is a further object of this invention, to provide a planter wheel with adjustable lugs which are arranged on the wheel in a manner to be self-accommodating with respect to fit and positioning with the remainder of the wheel and the other lugs. Thus, the lug members extend throughout the entire circumference of the wheel and provide the desired surface for both the valve and the seeds.

Other objects and advantages become apparent upon reading the following description in light of the accompanying drawings wherein:

FIG. 1 is a side elevational view of a preferred embodiment of this invention with parts thereof broken away.

FIG. 2 is an enlarged view of the fragment of the wheel that is shown in FIG. 1 and with a part thereof shown in a second position by dotted lines.

FIG. 3 is a fragmentary view of the radially outer side of a part shown in FIG. 2.

FIG. 4 is a fragmentary view of that shown in FIG. 3.

FIG. 5 is a sectional view taken on the line 5—5 of FIG. 2.

FIG. 6 is a view of a fragment of a wheel applicable in the combination shown in FIG. 1, and being a different embodiment from the wheel shown in FIG. 2.

FIG. 7 is a sectional view taken on the lines 7—7 of FIG. 6.

FIG. 1 shows a general arrangement of a hill-drop type of planter, and it discloses a seed hopper 10 attached to links 11 which in turn are conventionally connected to the tool bar 12 which is of course conveyed in the forward direction by a tractor (not shown). Since this mechanism is of a conventional nature, it need not be further disclosed as it will be readily understood by one skilled in the art. The planter therefore also includes the press wheel frame 13 in the trailing position, and it has the runner seed opener 14 which operates on the ground level indicated G to provide the furrow indicated F. Of course the runner is attached to the planter through the means shown including the link 16 and the housing 17 extending directly below the hopper 10. The seed metering mechanism 18 and the funnel 19 are disposed therebelow to receive the seed from the hopper 10 and drop it in the housing 17. Thus seed designated S is shown falling in the housing 17. Also of course groups of seeds S are shown along the furrow F as the seed is deposited in the groups as shown by means of the planter wheel hereinafter described.

The wheel is generally designated 21 and is rotatably mounted in the housing 17 with the wheel having its center shaft at the location indicated 22. Thus of course it will be understood that the planter is driven in the forward direction, and the press wheel (not shown) drives the shaft 23 by means which are not necessary to show, and the shaft 23 in turn is connected by means not shown to the wheel 21 and the latter is therefore rotated in the clockwise direction as viewed in FIG. 1.

A plate 24, sometimes designated a valve, is povoted about the point designated 26 in the housing 17 and it has its compression coil spring 27 in contact therewith for urging the plate 24 against the wheel 21. The plate 24 therefore holds the seed S against the outer periphery of the wheel 21 until the desired time for releasing the seed S in groups of two or three as shown, and the plate end 25 contacts the periphery.

In the arrangement of the planter wheel, it is well known to provide lobes which are projections extending radially outwardly on the wheel to pivot the plate 24 downwardly and thereby permit the seed S to pass from the housing 17 and on to the ground as desired. Therefore it will be noted that the wheel 21 is provided with members 28 which are shown to be four in number around the circumference of the wheel body designated 29, and this is of course the rim of the wheel. Thus as shown in FIG. 1, it will be noted that there are four members 28 with each one presenting a radially outward projection 31 which slides over the valve plate 24 to release the seed four times with each single revolution of the wheel 21. FIG. 1 also indicates a cover plate 32 is releasably attached by means of a bolt indicated at 33 to the housing 17 and thus the plate 32 can be readily removed from the housing 17 to leave the wheel 21 exposed and accessible for a purpose hereinafter mentioned.

FIG. 2 shows the wheel body 29 is provided with a pocket 34 for each of the members 28, and the end designated 36 of the member 28 is shown disposed within the radially outer limit of the pocket 34. At this time it will of course also be noted that the member 28 is secured to the outer circular surface 37 of the wheel body 29 by means of the bolt 38 extending through the end 39 of the member 28 and through the flange 41 of the wheel body 29. An opening 42 is provided in the wheel body 29 for receiving the inner end of the bolt 38 and receiving the nut 43. The member 28 also has the intermediate elongated portion 44 and the offset end portion 46 and the radially extending portion 47 which actually provides the lug or radial projection on the member 28 when the latter is in the position shown in FIGS. 1 and 2 in solid lines.

Also the member 28 is of a spring steel or like material which is sufficiently resilient so that the member 28 can be disposed between the solid line position shown in FIG. 2 and the dotted line position shown therein. In the latter position, it will of course be seen that the portions 36, 46, and 47 of the member 28 are disposed within the pocket 34 which extends through the outer circumference of the wheel body as shown. It will therefore now be apparent and understood that in order to vary the number of lugs or projections on the wheel 21, the operator need only depress a member 28 to dispose it within the pocket 34 as shown in the dotted position in FIG. 2 and thereby eliminated the projection of that member 28 and still provide a continuous curvature to the outer periphery or circumference of the wheel 21 as shown by the dotted position of the member 28 in FIG. 2. Thus it will be noted that the portion 44 of the depressed member 28 aligns with the end portion 39 of the adjacent member 28 to form the continuous curve as desired. In both positions, only the special members 28 form the circumference of the wheel 21, and the wheel body 29 is not on the circumference. In order to retain the member 28 in the depressed position a notch 48 is provided in the wheel body 29 at the inner end of the pocket 34 to engage the edge of the member 28 and hold it inwardly as shown. Likewise a notch 49 is provided in the outer end of the pocket 34 to hold the member 28 in the radially outwardly projected position shown.

Observing the configuration of the member 28 in its free position in FIG. 4, it will therefore be understood that when the member is in the extended position in FIG. 2 it will have its spring pressure acting radially inwardly to retain the member firmly in the FIG. 2 position. Likewise, when the member is placed in the dotted position in FIG. 2, then the spring pressure would act radially outwardly to retain the member 28 in the dotted position shown. Also, the end of the member 28 has a notch designated 51 and this notch straddles the web 52 of the wheel body 29 as shown in FIG. 5. The arrangement mentioned therefore provides alignment of the members 28 between the bolt 38 and the web 52 so that of course each member 28 is oriented between its opposite end in the alignment desired. Of course the bolt 38 extends through the opening 53 in the member 28 to secure the member 28 to the wheel body 29. Therefore it will be seen that only hand or finger pressures are necessary for the operator to readily alter the position of the member 28 between the solid line and the dotted line position shown. Also, the end portions 39 beyond the anchor points of the bolts 38 and the pockets 34 are arcuate on the members 28 to conform to the circumference of the wheel body 29 and provide the continuous curve desired for operation of the plate 24 mentioned in connection with FIG. 1.

FIG. 6 shows a modification of the wheel 21 and it will here be noted that the wheel has a body indicated 56 and is of course mountable in the combination shown in FIG. 1. The body 56 has a plurality of bolt hole openings 57 extending therearound, and it will also be noted that the body releasably receives members generally designated 58 which are secured thereto through bolts 59. The members 58 are generally T-shaped, as shown in FIG. 7, and they have the web portion 61 and the outer arcuate flange portions 62. Also the members have the radial portion 63 and the end portion 64. It will therefore again be understood that the radial portion 63 provides the projection or lug for the member 58 and thus the wheel 21.

Again it will be noted that there are a plurality of the members 58 adjustably mounted on the wheel body 56 by means of the bolts 59. Thus the member 58 in the upper portion of FIG. 6 is shown to be extended on the wheel body while the member 58 on the left lower side of FIG. 6 is shown to be retracted radially inwardly. It will therefore be noted that the member 58 has two bolt holes 66 and 67, and one bolt slot 68. Thus depending upon the use of the bolt hole 66 or 67, the member 58 will be either extended or retracted with respect to the wheel body 56. Also the slot 68 provides for radial adjustment of the member 58 so that its portion 62 can arcuately align with the adjacent portion 64 of the adjacent member 58 as shown. Therefore in this manner the members 58 can be extended to provide the radial lugs or projections in the quantity desired, or they can be retracted radially inwardly to provide the continuous circle or circumference desired. Therefore the spacing between the radially outer end of the slot 68 and the bolt hole 67 is the same as the spacing between the radially inner end of the slot 68 and the bolt hole 66 and one can therefore readily and accurately adjust the position of the members 58 as desired. It will therefore be understood that the members 21 have the radially oriented surfaces 69 and the arcuate surfaces 71. When the members 21 are disposed radially inwardly each one presents one-quarter of an arc of the complete circular circumference of the wheel where of course four of the members 28 are employed. Therefore, it is when the members 28 are disposed radially inwardly that they present and extend through the one-quarter arc of the circle, so that the portion 62 of the member 58 presents the one-quarter arc, and the length 39 and 44 of the member 28 present the one-quarter arc when the latter member 28 is disposed radially inwardly.

This invention has been described by disclosing specific embodiments thereof, however, it should be apparent that certain changes could be made in the embodiments and the invention should therefore be determined by the scope of the appended claims.

What is claimed is:

1. A wheel for use in a seed planter of the hill-drop type including a wheel housing and drive means for rotating said wheel and a movable plate in contact with the outer periphery of said wheel, comprising a wheel body, a plurality of members radially movably mounted on said wheel body and being of the width of said wheel body and extending radially therebeyond and having arcuate surfaces extending along the radially outer surfaces of said members and being in end-to-end contact and continuously curved in a composite circle of all said members when all said members are disposed radially inwardly on said wheel body, said members being movable radially outwardly and having radially oriented surfaces presenting radialy outer projections when said members are disposed radially outwardly on said wheel body, and readily releasable means operatively connected between said wheel body and said members for adjustably securing said members in selected radially inward and radially outward positions.

2. A seed planter of the hill-drop type, comprising a wheel housing, a plurality of members assembled in a circle and being radially movably operatively interconnected and being rotatably mounted in said housing, a movable plate disposed with a portion in sliding contact with said members upon rotation of the latter, said members having smooth surfaces extending along their radially outer surfaces and presenting a continuously smooth periphery disposed to be in continuous sliding contact with said portion of said movable plate upon full rotation of said wheel when all said members are disposed radially inwardly for retaining seeds against said periphery, said members being movable radially outwardly with respect to each other and including radially outer projections when said members are disposed radially outwardly to be in discontinuous sliding contact with said portion of said movable plate upon full rotation of said wheel for dropping seeds past said movable plate, and readily releasable means operatively connected between said members for adjustably securing said members in selected radial positions.

3. A wheel for use in a seed planter of the hill-drop type including a wheel housing and drive means for rotating said wheel and a movable valve in contact with the outer periphery of said wheel, comprising a wheel body, a plurality of members radially movably mounted on said wheel body and being of the width of said wheel body and adapted to have said members present a continuously smooth outer periphery in contact with said movable valve when all said members are disposed radially inwardly on said wheel body, releasable adjustable means operatively connected between said wheel body and said members and having two positions of connection with one position providing the radially inner position of said members and the other position providing the radially outer position of said members, said members being selectively movable radially outwardly on said wheel body upon release of said adjustable means, and said members being secured in said radially outward positions by said adjustable means, and said members having radially outward projections interrupting said smooth outer periphery and presenting lugs on said wheel for actuating said valve body upon rotation of said lugs therepast.

4. A seed planter of the hill-drop type comprising a wheel housing with a removable cover, drive means for rotating said wheel, a movable plate in contact with the outer periphery of said wheel, a wheel body rotatably mounted in said housing, a plurality of members radially movably mounted on said wheel body and extending radially therebeyond and being accessible to be touched when said cover is removed and with said members being in endless end-to-end contact and presenting a smooth periphery on said wheel when all said members are disposed radially inwardly on said wheel body, said members being movable radially outwardly and including radially outer projections on said wheel when said members are disposed radially outwardly on said wheel body, and readily releasable means operatively connected between said wheel body and said members for adjustably securing said members in selected radially inward and radially outward positions.

5. A wheel for use in a seed planter of the hill-drop type including a wheel housing and drive means for rotating said wheel and a movable plate in contact with the outer periphery of said wheel, comprising a wheel body, a plurality of members of spring material radially movably mounted on said wheel body and being in end-to-end contact and presenting a smooth periphery on said wheel when all said members are disposed radially inwardly on said wheel body, said members being movable radially outwardly and including radially outer projections on said wheel when said members are disposed radially outwardly on said wheel body, one end of said members being fixedly attached to said wheel body and with the other end of said members being flexible between said radial positions, and readily releasable means operatively connected between said wheel body and said members for adjustably securing said members in selected radial positions.

6. A wheel for use in a seed planter of the hill-drop type, comprising a wheel body, a plurality of members of spring material of the width of said wheel body and radially movably mounted on said wheel body and presenting a smooth and endless periphery on said wheel when all said members are disposed radially inwardly on said wheel body, said members being movable radially outwardly and including radially outer projections on said wheel when said members are disposed radially outwardly on said wheel body, one end of said members being fixedly attached to said wheel body and with the other end of said members being flexible between said radial positions, and a notch-and-projection means operatively connected between said wheel body and said other end of said members for releasably securing the latter in said radial positions.

7. A wheel for use in a seed planter of the hill-drop type including a wheel housing and drive means for rotating said wheel and a movable plate in contact with the outer periphery of said wheel, comprising a wheel body with an outer circumference, a plurality of members of spring material radially movably mounted on said wheel body and extending along said circumference thereof and presenting a smooth periphery on said wheel when all said members are disposed radially inwardly on said wheel body, said members being movable radially outwardly and having radially oriented surfaces presenting radially outer projections on said wheel when said members are disposed radially outwardly on said wheel body, one end of said members being fixedly attached to said circumference of said wheel body and with the other end of said members being flexible between said radial positions, said wheel body having a pocket in said circumference receiving a portion of said other end and with said wheel body having two notches radially spaced apart along said pocket, and said portions of said members being spring-pressure secured in said notches.

8. A wheel for use in a seed planter of the hill-drop type comprising a wheel body having a circumference, a plurality of flat-spring members fixedly attached at one end to said wheel body and extending along said circumference and being flexible into arcuate form and being in end-to-end contact and continuously curved in a composite circle of all said members when all said members are disposed radially inwardly on said wheel body, said wheel body having notches for releasably receiving ends of said members and retain the latter radially inwardly, said members being flexible to a position radially outwardly and having radially oriented surfaces presenting radially outer projections when said members are disposed radially outwardly on said wheel body.

9. A wheel for use in a seed planter of the hill-drop type comprising a wheel body having a circumference, a plurality of flat-spring members fixedly attached at one end to said wheel body and extending along said circumference and being flexible into arcuate form and being in end-to-end contact and continuously curved in a composite circle of all said members when all said members are disposed radially inwardly on said wheel body, said wheel body having notches for releasably receiving ends of said members and retain the latter radially inwardly, said members being flexible to a position radially outwardly and having radially oriented surfaces presenting radially outer projections when said members are disposed radially outwardly on said wheel body, and notch-and-projection means operatively interconnected between said wheel body and said ends of said members and adapted to laterally align said members on said wheel body in both said radial positions.

10. A wheel for use in a seed planter of the hill-drop type including a wheel housing and drive means for rotating said wheel and a movable plate in contact with the outer periphery of said wheel, comprising a wheel body, a plurality of members releasably mounted on said wheel body and extending radially therebeyond and having smooth surfaces extending along the radially outer surfaces and being aligned and in end-to-end contact to be continuously smooth and disposed to be in continuous contact with said movable plate upon full rotation of said wheel when all said members are disposed radially inwardly on said wheel body, said members being releasably mountable radially outwardly on said wheel body and including radially outer projections when said members are disposed radially outwardly on said wheel body to be in discontinuous contact with said movable plate upon full rotation of said wheel, and readily releasable means operatively connected between said wheel body and said members at each end of the latter for securing said members in selected radial positions on said wheel body and with said means at one end of said members being adjustable.

11. A wheel for use in a seed planter of the hill-drop type including a valve, comprising a wheel body, a plurality of members releasably attached to said wheel body in a radially inward position and having smooth surfaces extending along their radially outer surfaces and being of the width of said wheel body and with the periphery of said wheel consisting of only said members and being in end-to-end contact and continuously smooth when all said members are disposed radially inward on said wheel body, said members being releasably attachable to said wheel body in a radially outward position and including radially outer projections when said members are disposed radially outwardly on said wheel body, and bolt means operatively connected between said wheel body and said members for adjustably securing said members in selected radial positions on said wheel body.

12. A wheel for use in a seed planter of the hill-drop type including a valve, comprising a wheel body, a plurality of members mounted on said wheel body and being the width of said wheel body and extending radially therebeyond with one end of each of said members having an arcuate surface extending along the radially outer surface of said member and being in end-to-end contact and presenting a continuous circle between said members when all said members are disposed radially inwardly on said wheel body, and with an intermediate portion of each of said members having a radially oriented surface presenting a radially outer projection when said members are disposed radially outwardly on said wheel body, and each of said members having an arcuate portion on the other end thereof and being of a length sufficient to abut said one end of the adjacent one of said members for presenting an endless arrangement of said members, and releasable means operatively connected between said wheel body and said members for releasably securing the latter in said radial positions.

13. A wheel for use in a seed planter of the hill-drop type including a wheel housing and drive means for rotating said wheel and a movable plate in contact with the outer periphery of said wheel, comprising a wheel body, and a plurality of members selectively positionably mounted on said wheel body and extending radially therebeyond and having arcuate surfaces extending throughout the length of the radially outer surfaces of said members and presenting a continuous circle along the lengths of said members when all said members are disposed radially inwardly on said wheel body, releasable means operatively connected between said wheel body and said members for selective fixedly positioning any of said members radially inwardly and outwardly on said wheel body, and with said members having radially oriented surfaces presenting radially outer projections when said members are disposed radially outwardly on said wheel body.

References Cited by the Examiner
UNITED STATES PATENTS

| | | | |
|---|---|---|---|
| 491,459 | 2/1893 | Yarbrough | 222—306 X |
| 743,949 | 11/1903 | Stevens | 222—306 X |
| 1,226,187 | 5/1917 | Cole | 111—79 |
| 3,133,515 | 5/1964 | Beebe | 111—36 |
| 3,176,636 | 4/1965 | Wilcox et al. | 111—51 |

ABRAHAM G. STONE, *Primary Examiner.*

WILLIAM A. SMITH III, *Examiner.*